US008392468B2

(12) United States Patent
Sato

(10) Patent No.: US 8,392,468 B2
(45) Date of Patent: Mar. 5, 2013

(54) MEDIA INFORMATION SEARCH APPARATUS AND MEDIA INFORMATION SEARCH METHOD

(75) Inventor: Kazuhiro Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 10/963,642

(22) Filed: Oct. 14, 2004

(65) Prior Publication Data

US 2005/0086265 A1 Apr. 21, 2005

(30) Foreign Application Priority Data

Oct. 20, 2003 (JP) ................. P2003-360051

(51) Int. Cl.
*G06F 7/00* (2006.01)
*G06F 17/30* (2006.01)
(52) U.S. Cl. ......... 707/802; 707/769; 707/758; 707/706
(58) Field of Classification Search .................. 707/1, 3, 707/6, 781, 706, 769, 791, 802; 380/277; 369/33, 30; 704/243, 231
See application file for complete search history.

(56) References Cited

U.S. PATENT DOCUMENTS

| | | | | | |
|---|---|---|---|---|---|
| 5,751,672 | A | * | 5/1998 | Yankowski | 709/238 |
| 6,031,797 | A | * | 2/2000 | Van Ryzin et al. | 369/30.28 |
| 6,192,138 | B1 | * | 2/2001 | Yamadaji | 382/100 |
| 2001/0004338 | A1 | * | 6/2001 | Yankowski | 369/34 |
| 2001/0029832 | A1 | * | 10/2001 | Kanda et al. | 84/609 |
| 2002/0049717 | A1 | * | 4/2002 | Routtenberg et al. | 707/1 |
| 2002/0060955 | A1 | * | 5/2002 | Kumagai | 369/30.05 |
| 2004/0015398 | A1 | * | 1/2004 | Hayward | 705/14 |
| 2004/0039722 | A1 | * | 2/2004 | Kudo et al. | 707/1 |
| 2004/0052378 | A1 | * | 3/2004 | Shiragami et al. | 380/277 |
| 2004/0199387 | A1 | * | 10/2004 | Wang et al. | 704/243 |
| 2007/0083471 | A1 | * | 4/2007 | Robbin et al. | 705/51 |

FOREIGN PATENT DOCUMENTS

| | | | |
|---|---|---|---|
| EP | 1122729 | * | 1/2001 |
| EP | 1 122 729 A1 | | 8/2001 |
| EP | 1 122 729 A1 | | 8/2001 |
| EP | 1122729 | * | 8/2001 |
| JP | 08-306170 | | 11/1996 |
| JP | 10-283403 | | 10/1998 |
| JP | 11-514482 | | 12/1999 |
| JP | 2001-307464 | | 11/2001 |

(Continued)

OTHER PUBLICATIONS

EPO Search Report dated Feb. 14, 2005.

(Continued)

*Primary Examiner* — Robert Beausoliel, Jr.
*Assistant Examiner* — Hexing Liu
(74) *Attorney, Agent, or Firm* — Rader, Fishman & Grauer PLLC

(57) ABSTRACT

In order to perform reliable acquisition of album names and song titles while a CD is played back, compressed in MP3 format and filtered, the TOC information of the CD is read out by a CD playback section of a playback/dubbing apparatus. This information is then sent from a system controller to a TOC album relevant information database via a network server and a network communication and corresponding album names and song titles are then acquired. In the case in which corresponding contents information cannot be acquired at the database, the system controller reads out copyright information (ISRC code) of the CD using the CD playback section, searches databases of homepages for music companies or sales companies via the network server and the network communication based on this information, and acquires album names and song titles.

23 Claims, 7 Drawing Sheets

FOREIGN PATENT DOCUMENTS

| JP | 2001-312877 |   | 11/2001 |
|----|-------------|---|---------|
| JP | 2002-258874 |   | 9/2002  |
| JP | 2002-269900 |   | 9/2002  |
| JP | 2002-269904 | * | 9/2002  |
| JP | 2002-288203 |   | 10/2002 |
| JP | 2003-058543 |   | 2/2003  |
| JP | 2003-067408 |   | 3/2003  |
| JP | 2003-256464 |   | 9/2003  |

OTHER PUBLICATIONS

"Real JukeBox Plus Manual" Anonymous, XP-002315759, 1999, URL: www.real.com.

Japanese Office Action dated Sep. 13, 2006 for Application No. 2003-360051.

Japanese Office Action dated Jun. 19, 2006 for Application No. 2003-360051.

Japanese Office Action issued Dec. 17, 2008 for corresponding Japanese Application No. 2006-23353.

European Communication Pursuant to Article 94(2) EPC issued Nov. 23, 2012 for corresponding European Application 04 292 492.

Anonymous, "RealJukebox Plus Manual" REAL, 1999, XP-002315759, Retrieved from the Internet (Jan. 28, 2005): www.real.com.

* cited by examiner

MEDIA INFORMATION SEARCH APPARATUS AND MEDIA INFORMATION SEARCH METHOD

CROSS REFERENCE TO RELATED APPLICATIONS

The present document is based on Japanese Priority Document JP2003-360051, filed in the Japanese Patent Office on Oct. 20, 2003, the entire contents of which are incorporated herein by reference.

BACKGROUND OF THE INVENTION

1. Field of the Invention

The present invention relates to a media information search apparatus and search method, and particularly relates to a recoding media search apparatus and recording media search method for taking in and displaying or storing the contents of signals when playing back or storing the signals recorded in a recording medium.

2. Description of Related Art

Optical disc players etc. employing disc-shaped recording media, such as CDs (Compact Discs) and MDs (MiniDiscs) for digitally recording audio signals of music, etc. have become widespread. There also has been a tendency to provide CD players and MD players with dubbing functions where the contents of CDs and MDs are stored on a large-capacity HD (Hard Disc) or DVD (Digital Versatile Disc). Personal computers also have appeared where this kind of archive function is made possible using a combination of hardware and software.

For a CD or MD, for example, as one song is taken to be one program (referred to as a "track"), one or a plurality of programs (tracks) then being recorded constitute one album overall. An operation of dubbing to another recording medium, such as a HD, from a CD or MD as a recording source is then possible either, for example, by dubbing the whole CD, i.e. dubbing in an album unit, or by only dubbing tracks designated by a user.

Contents information is not typically included on a CD. When dubbing, i.e., archiving is then carried out to a HD or DVD, etc. using compression technology such as MP3, etc. that is one data compression format, it is necessary to input manually song titles and album names for every song. This means that dubbing or archiving operations are somewhat troublesome.

In a CDDB (Compact Disc DataBase) constituting a CD contents information database, which is accessible over the Internet, there are also cases where TOC (Table of Contents) data are associated with song titles and album names. It is then possible for a CD player capable of being connected to the Internet to acquire song titles and album names automatically using this database and display this information at a display of the CD player. However, this database CDDB does not cover all CDs, and there may be cases where automatic acquisition is not possible where input will have to take place in the conventional manual manner.

Further, there may be cases in the related art where two or more items of album information exist for a single item of TOC data. This is because the bulk of this database CDDB is made by input by general users. There also may be cases where errors are not verified, resulting in erroneous data being mixed in because input is carried out by users.

Therefore, if a search is carried out at a CD player to acquire contents information via the database CDDB utilizing the Internet, then either all of the searches will result in complete searches not being possible or erroneous contents information may be acquired for display and storage, depending on the case.

In Japanese Patent Application Publication No. Hei. 8-306170; a media information search apparatus is disclosed in which an optical information search apparatus reads out unique identifying information stored in advance in a plurality of optical discs housed in a disc housing section using a unique identifying information reader. Index information for identifying media is then searched from the database according to the read unique identifying information. Recorded contents information for a plurality of recording media is then searched in a straightforward manner as a result of a search controller retrieving recorded contents information corresponding to searched information for use in detected media identification from the database.

This apparatus can only search information from contents information recorded in a database prepared in advance, such as, for example, a database prepared on a CD-ROM. It is therefore not possible to search the information about new CDs from the database of the above CD-ROM if the CDs come out after this database is obtained.

In Japanese Patent Application Publication No. 2002-269904, a data management apparatus is disclosed in that each item of data dubbed from a first recording medium to a second recording medium is managed using database means, identification information for the first recording medium being managed using the database means. It is possible to obtain additional information from an external server via communication means. It is also possible to obtain additional information, such as song titles and other information, without user input being required by recording the obtained additional information in the database means automatically. Thus, additional information for data dubbed to the large-capacity second recording medium is automatically recorded, which increases both usefulness and operativity for the user.

This kind of data management apparatus has the drawback that it is not possible to carry out further searching in the case that corresponding contents information does not exist in the case of searching the external database CDDB based on track information obtained using the TOC information.

[Patent Document 1]
Japanese Patent Application Publication No. Hei. 8-306170.
[Patent Document 2]
Japanese Patent Application Publication No. 2002-269900.
[Patent Document 3]
Japanese Patent Application Publication No. 2002-269904.
[Patent Document 4]
Japanese Patent Application Publication No. 2003-67408.

SUMMARY OF THE INVENTION

It is therefore advantageous for the present invention to provide a media information search apparatus and, search method capable of automatically obtaining, displaying or storing contents information of a signal when playing back or storing the signal recorded in a recording medium.

It would be further advantageous for the present application to provide a search apparatus and search method capable of taking in contents information for a signal utilizing various types of databases connected via a communication network.

It would be advantageous still further for the present application to provide a search apparatus and search method capable of searching and capturing contents information from an external database in a more accurate manner.

The advantages stated above and further advantages will be clarified by reference to the technological concepts and practical examples of this invention described below.

The main aspects of the invention relate to a search apparatus that is a media information search apparatus including a recording and/or reproducing device for playing back and storing signals recorded in a recording medium and a database connected to the recording and/or reproducing device via a communication network for accumulating contents information of the signals, wherein when the signals recorded in the recording medium are played back or stored, the contents information of the signals are taken in from the database via the communication network.

It is also preferable, when the signals recorded in the recording medium are audio signals of music, for the contents information for the music to be taken in from the homepage database of a music company or a music mail order company to display or store based on copyright information recorded in the recording medium. It is preferable that valid contents information of a music company or music mail order company homepage is taken in from the copyright information and recording year information. It is also preferable that corresponding contents information of a music company or music mail order company homepage is taken in from the recording media track information. It is appropriate that the music contents information is stored in storage means of a server connected to a communication network. It is further preferable that the music contents information is stored in storage means of the search apparatus.

The main aspects of a search method of the invention relate to a media information search method of searching the contents of audio signals when the audio signals recorded in the recording medium are played back or stored, including the steps of accessing a track information database via a communication network based on track information of the audio signal so as to acquire corresponding contents information, and, in the case in which corresponding contents information is not searched within the track information database, accessing a database of a music company or music mail order company via a communication network based on copyright information of the audio signals so as to obtain corresponding contents information.

In the case in which two or more items of corresponding contents information exist within the track information database, it is preferable that similar contents information is automatically searched for using prestored contents information. It is also possible that in the case in which two or more items of corresponding contents information exist in the track information database, the contents of them to be displayed so that the user can then select the contents information. It is also possible that advertisements of the music company or music mail order company to be automatically sent to the search side when the database of the music company or music mail order company is accessed. It is also possible for the contents information to be tailored at an external conversion site through connection via a communication network so that unnecessary data may be deleted.

A preferred embodiment of the present invention relates to a system for automatically browsing homepages of music companies or sales companies according to copyright information of IRSC (International Standard Recording Code) data constituting CD copyright information in contents information searches of images and music. It is also preferable for valid contents information from homepages of music companies and sales companies to be automatically searched using recording year information of IRSC data of CDs. It is also possible for valid information of music company and sales company homepages to be automatically acquired using track information based on CD recording year information and CD TOC (Table of Contents) information. It is also possible for homepage address information to be stored on the server of an external network. It also may be preferable for homepage address information to be stored in a search system itself. Moreover, at the time of displaying contents information, it is also appropriate to automatically display advertisements by the copyright information of the ISRC data.

A data search system using TOC information is a system for automatically selecting correct information using the ISRC data in the case that two or more items of album information exist. It is also possible for correct information to be automatically selected by making data through filtering or priority displaying based on pre-registered user preferences or album data archived by the user. It is further possible for album information to be tailored using an external conversion site so that unnecessary data are not transmitted.

According to the embodiment described above, even in the case in which it is necessary to input information manually on the user side, relevant information relating to contents can be acquired automatically and therefore information can be acquired with just a simple album designation selection operation. It is also possible to promote sales of sales companies promoting music media, such as compact discs, by causing the homepage information of these companies to be browsed automatically.

The bulk of data in a current CD album database using a TOC is inputted by general users, and therefore this contains a substantial number of errors. The above embodiment of the present invention is also extremely useful in confirming these kinds of errors. Further, the costs required for this system are insubstantial because it is possible to use various types of external databases and search engines to construct the present embodiment. In the implementation of the present embodiment, it is possible to search contents information of CDs by efficiently utilizing existing systems without having to construct large-scale systems so as to bring about systems that are mutually beneficial to users, manufacturers and sales companies.

The invention principally relates to a search apparatus including a recording and/or reproducing device for playing back and storing signals recorded in a recording medium and a database, connected to the recording and/or reproducing device via a communication network, for accumulating contents information of the signals, wherein when the signals recorded in the recording medium signals are played back or stored, the contents information of the signals are taken in from the database via the communication network.

According to the media information search apparatus, it is possible to take in contents information of signals from an external database via a communication network while playing back or storing signals recorded in a recording medium, and the contents information may then be displayed or stored.

The main aspects of a search method of the invention relate to a search method of searching the contents of audio signals when the audio signals recorded in the recording medium are played back or stored, including the steps of accessing a track information database via a communication network based on track information of the audio signals so as to acquire corresponding contents information, and, in the case in which corresponding contents information is not searched within the track information database, accessing a database of a music company or music mail order company via a communication network based on copyright information of the audio signals so as to obtain the corresponding contents information.

According to the information search method, it is possible to obtain contents information from a track information based database based on track information of audio signals, and it is possible to access a database of a music company or mail order company based on copyright information and obtain corresponding contents information in the case that contents information cannot be searched within the track information database. This means that it is possible to obtain contents information by utilizing a broader range of external databases, and is it then possible to display or store this contents information.

DESCRIPTION OF THE PREFERRED EMBODIMENT

Figure 1:
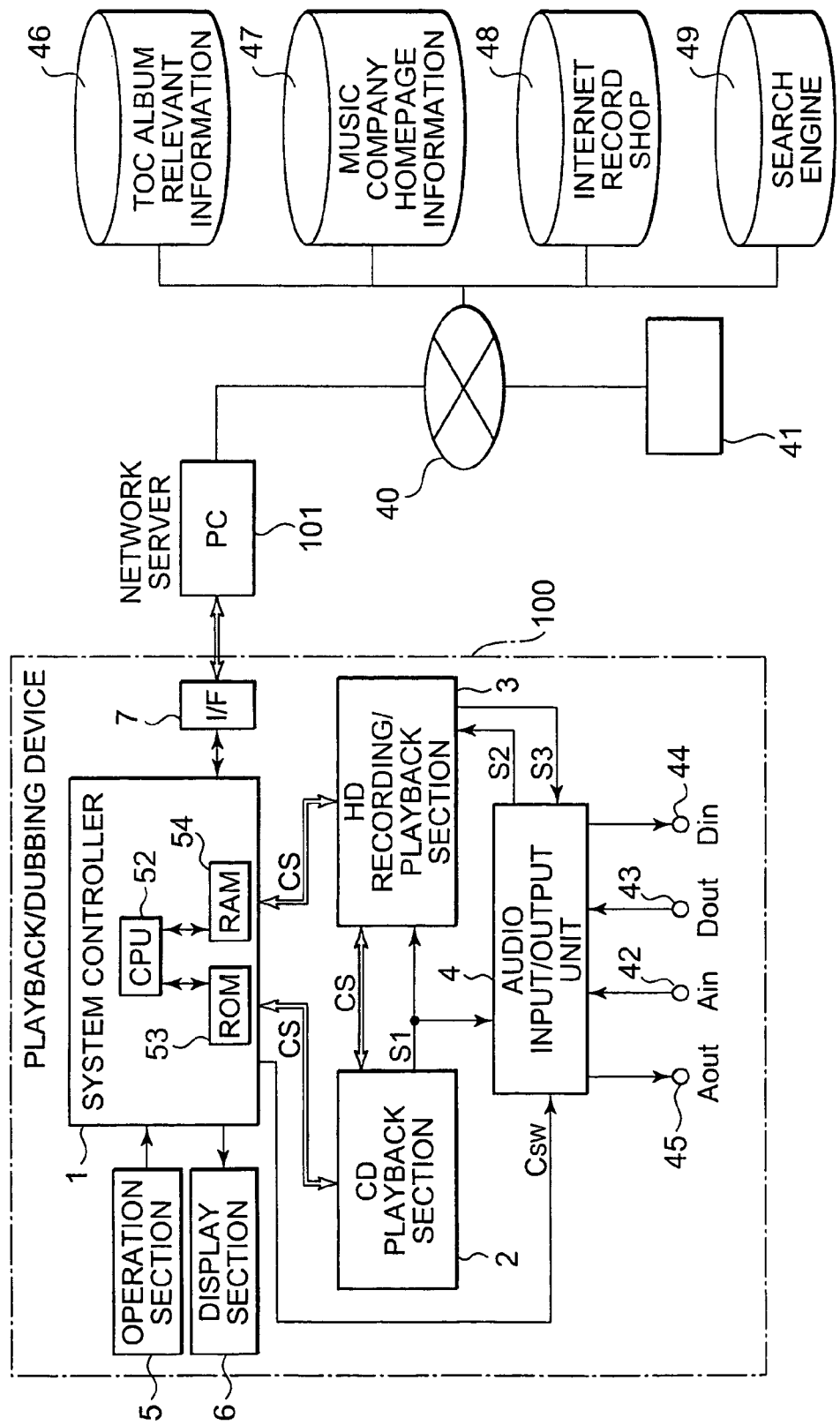
FIG. 1 is a block view showing a system configuration of a playback/dubbing device.

FIG. 1 shows a configuration of a playback/dubbing device 100 of the present embodiment. This device includes a system controller 1, a CD playback section 2, a HD recording/playback section 3, an audio input/output section 4, an operation section 5, a display section 6, and an interface 7. The playback/dubbing device 100 and a personal computer 101 are connected together so as to constitute a data management apparatus. In this case, the personal computer 101 is mainly performed as a function of communication means.

In the device 100, the system controller 1, the CD playback section 2 and the HD recording/playback section 3 all communicate with each other using various control signals CS. This may be, for example, a bus connection structure. The system controller 1 sends control signals CS to the CD playback section 2 and the HD recording/playback section 3 so as to cause the CD playback section 2 and the HD recording/playback section 3 to execute prescribed operations. The CD playback section 2 and the HD recording/playback section 3 send signals in response to the control signals CS, operating conditions (status), information, such as subcodes and TOC (described later) and other information necessary to the system controller 1.

The system controller 1 is constituted by a microcomputer, and the controls operations of the whole system through transmission of the control signals CS. The system controller 1 is supplied with input by the operation section 5. A power button, an eject button, a playback button, a pause button, a stop button, a select button and a recording button are provided on the operation section 5 and may be operated arbitrarily by the user. The system controller 1 then instructs the operations to be executed by the CD playback section 2 and the HD recording/playback section 3 using control signals CS according to operations of the operation section 5. Further, an operation in which a user designates a CD track number and then designates playback of an arbitrary song, a so-called operation "program playback" where a user designates a song order for playback, and a so-called operation "shuffle playback" that songs are played back at random are possible as operations. It is possible for a user to input additional information, such as song titles, and it is therefore preferable to provide buttons for inputting characters.

A display section 6 is connected to the system controller 1, and the system controller 1 provides display data to the display section 6 and causes the required displaying to be executed. For example, at the display section 6, time information, such as total performance time, elapsed time of songs during the performance, remaining performance time of songs being played back, and overall remaining song time, etc. and a track number of a song being performed, etc. are displayed as information relating to the CD installed in the CD playback section 2. A disc name (album name) and track name (song title) are also displayed in the case of a disc recorded with a disc name and track name.

The CD playback section 2 is loaded with a CD-DA corresponding to a first recording medium and plays back the CD-DA. Although this configuration is described in detail later, audio data S1 (PCM digital audio data) played back from the CD is supplied to the audio input/output section 4 and the HD recording/playback section 3. The CD playback section 2 is capable of playing back music data of CD format discs corresponding to CD-DA in the above description, but, it may be also similarly capable of playing back in the case of discs other than CD format discs recorded with music data, such as, for example, CD-R, CD-RW, etc. In one form of a CD-DA, discs referred to as CD-text discs also exist where text data is recorded in subcode. In this case, it is possible for the text data to be played back from the subcode together with playing back of the music data. In this example, an example is given taking a CD as a first recording medium, but this also may be another type of recording medium, such as a MD, a memory card, or a DAT (digital audio tape), etc. In the case of compatible recording medium, the CD playback section 2 is replaced correspondingly with (or have added) an MD playback section, a memory card playback section or a DAT playback section etc.

The HD recording/playback section 3 is provided with a HDD as a large capacity, second recording medium and is capable of recording and playing back data to and from the HDD. The capacity of the HDD constituting the second recording medium is in the order of a number of tens of gigabytes and has an extremely large capacity compared to that of the CD constituting the first recording medium. The configuration of the HD recording/playback section 3 is described in detail later. It is possible for audio data S1 from the CD playback section 2 and audio data S2 (PCM digital audio data) from the audio input/output section 4 to be input to the HD recording/playback section 3, and the HD recording/playback section 3 is capable of recording the audio data S1 and S2 to the HDD. The audio data S1 and S2 are, for example, music data signals conforming to, for example, IEC60958. Audio data S3 played back from the HDD can be output to the audio input/output section 4.

The audio input/output section 4 is for inputting and outputting audio data, and it outputs audio data played back from the CD playback section 2 and the HD recording/playback section 3 to the speaker system and to other equipment and inputs audio data (digital audio data or analog audio signals) provided by other equipment. The system controller 1 controls input and output paths of the audio input/output section 4 using a switching control signal CSW.

The system controller 1 connects with the personal computer 101 via the interface 7. For example, the personal computer 101 and the system controller 1 communicate using a clock asynchronous serial signal. Connection is carried out using a serial cable or USB cable normally used with a computer. The application operating on the personal computer 101 controls the system controller 1 so as to enable desired operations to be executed at the dubbing device 100.

The personal computer 101 has a function of communicating with a communication network 40 using a prescribed communication line, and it is capable of communicating with an external server via the communication network 40. Further, the personal computer 101 is capable of communicating with four databases 46, 47, 48 and 49 via the communication network 40. The database 46 is an information site for performing services for providing additional information regarding CDs sold normally. Corresponding CDs are then searched according to this CD identification information, and additional information corresponding to the CDs, such as album names, song titles of song collections, and ISRC, are provided.

Another database 47 is a database of music company homepages, and it is a database utilized to obtain contents information relating to CD albums and song titles. Moreover, database 48 is a database of a record shop, for example, Amazon.com (company name), etc., and is used for searching contents information relating to CD albums and song titles. Further, the search engine 49 accessed via the communication network 40 is a database for searching.

The personal computer 101 is capable of acquiring additional information by communicating with the external databases 46 to 49. Application software for executing automatic acquisition of additional information is provided at the personal computer 101 in order to execute communication processing to acquire additional information. It is also possible for an additional information automatic acquisition operation that is a characteristic operation of this embodiment to be implemented as a result of this application and the system controller 1 processing in cooperation with each other. The application operating on the personal computer 101 is capable of displaying information, such as CD song information or information recorded in the HDD, in a manner that is visually easy to understand using a GUI. It is then possible for a user to edit this information using this application. For example, operation using a GUI at a monitor display, etc. (not shown) connected to the personal computer 101 is also possible.

In the above, a description is given where the personal computer 101 is taken as the communication means and is taken to have part of the function of the control means for automatically acquiring additional information. However, it is also possible for a communication network device to be provided at the playback/dubbing device 100 so that the system controller 1 carries out communication operation control. In this situation, the personal computer 101 is no longer essential.

Figure 2:
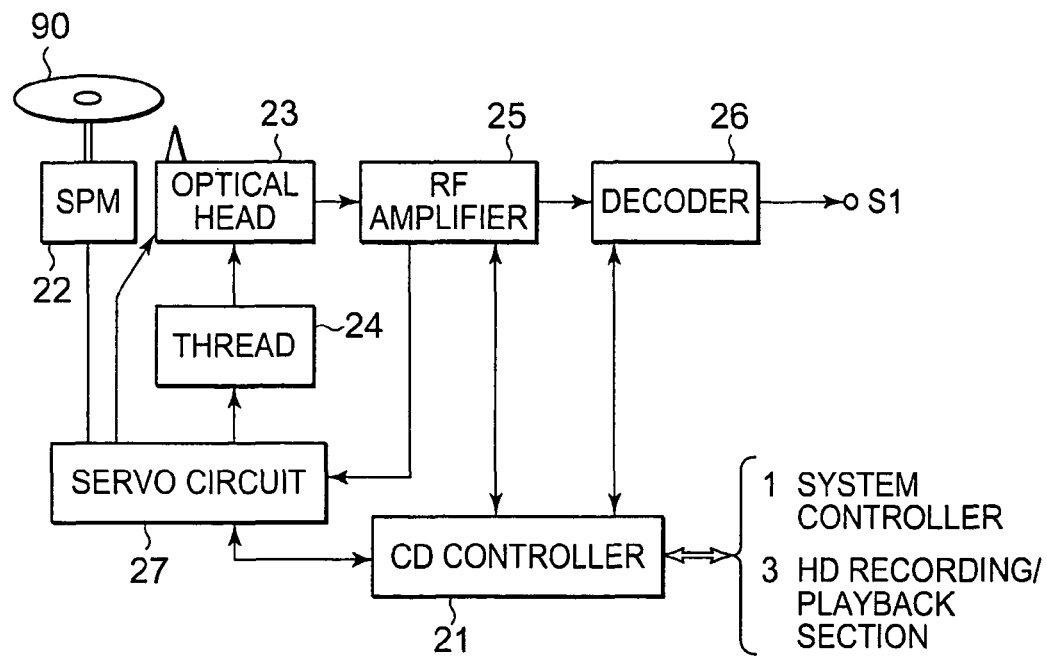
FIG. 2 is a block view showing a system configuration of a CD playback section.

Next, a description is given of the CD playback section 2 with reference to FIG. 2. A disc 90 is a CD loaded into the CD playback section 2. The disc 90 is rotatably driven at a constant linear velocity (CLV) by a spindle motor 22 at the time of a CD playback operation. Data recorded using pit-shapes on the disc 90 is then read-out by an optical head 23 and supplied to an RF amplifier 25.

In order to read out data from the disc 90, a laser diode constituting a laser light source (not shown), a photodetector for detecting reflected light, an object lens constituting a laser light output end, and an optical system for irradiating laser light onto the disc recording surface via the object lens and then guiding the reflected light to a photodetector are provided within the optical head 23. The object lens is supported in such a manner as to be capable of being moved in a tracking direction and a focusing direction by a two-axial mechanism. It is also possible to move the entire optical head 23 in a radial direction of the disc by a thread mechanism 24.

In addition to a RF playback signal, a focusing error signal and a tracking error signal are generated at the RF amplifier 25. These error signals are supplied to a servo circuit 27. The servo circuit 27 generates a focusing drive signal, a tracking drive signal, and a thread drive signal from the focusing error signal and tracking error signal and controls operation of the two-axial mechanism and thread mechanism 24 within the optical head 23. The servo circuit 27 generates a thread drive signal in accordance with the low pass component of the tracking error signal and an access designation signal from the CD controller 21, and it controls operation of the thread mechanism 24 so as to drive the optical head 23. The servo circuit 27 generates a spindle drive signal based on a spindle error signal and a spindle kick/brake signal supplied by a decoder 26 and CD controller 21 and controls the operation of the spindle motor 22.

A playback RF signal outputted from the RF amplifier 25 is supplied to the decoder 26. The decoder 26 performs EFM demodulation and CIRC decoding, etc. so as to decode information read from the disc 90 into 16 bit-quantized, 44.1 kHz sampled digital audio data S1. The digital audio data S1 is supplied to the HD recording/playback section 3 and the audio input/output section 4 as shown in FIG. 1. Control data, such as TOC and subcodes, are extracted at the decoder 26 and are supplied to the CD controller 21 for use in various types of control.

The CD controller 21 is a microcomputer for controlling the CD playback section 2. It is necessary to read out management information, i.e., TOC information recorded in the CD at the time of playing back the disc 90 (CD). The CD controller 21 distinguishes the number of tracks and address of each track recorded in the disc 90 in accordance with this management information and controls the playback operation. To achieve this, the CD controller 21 reads out the TOC during loading of the disc 90 by playing back the innermost periphery of the disc where the TOC is recorded. This is then, for example, stored in internal RAM, and it can then be referred to when playing back the disc 90.

In the case that the disc 90 is a CD text disc, text data is recorded within subcode forming the TOC data. The CD controller 21 then reads out this text data when reading the TOC and stores the text data in internal RAM. There is also an embodiment where the text data are recorded within subcode in a program area rather than in a so-called TOC area. In this case, the text data are taken in together with subcode data extracted according to the progress of playback of the program (tracks).

The CD controller 21 is capable of carrying out communication for each type of control signal CS with the system controller 1 and the HD recording/playback section 3 (HD controller 31 within the HD recording/playback section 3 (described later). For example, the system controller 1 informs the CD controller 21 of this operation information while playback, fast forward (FF), rewind (REW), AMS (cue), pause (pause), stop and dubbing execution operations, etc. are carried out for a CD from the operation section 5. The CD controller 21 controls each part of the CD playback section 2 so that desired operations by the user are executed according to this operation information. The CD controller 21 sends information such as the operating state of the CD playback section 2, TOC information and text information read from the disc 90, and time information (addresses) for during CD playback to the system controller 1. The system controller 1 is able to comprehend the operating state of the CD playback section 2 from transmissions from the CD controller 21 and executes various displays at the display section 6 based on the TOC and subcode information. Although described in detail later, the CD controller 21 transfers various information to and from the HD recording/playback section 3 during the dubbing operation.

Figure 3:
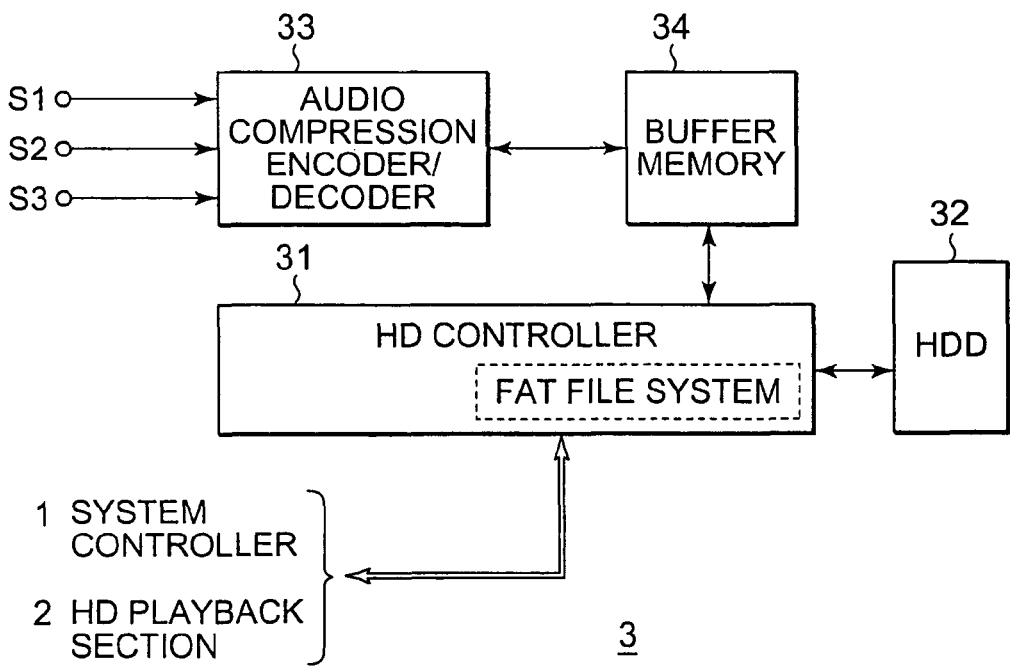
FIG. 3 is a block view showing a system configuration of a HD recording/playback section.

Next, a description is given of the HD recording/playback section 3 with reference to FIG. 3. The HD recording/playback section 3 is provided with a HDD (Hard Disc Drive) 32 as a large-capacity, second recording medium. The HD controller 31 is a controller for controlling operation of the HD recording/playback section 3. A mechanism referred to as a file system for implementing accessing to, reading from and writing to the HDD 32 is built into the HD controller 31. This is, for example, a FAT 32 file system.

As shown in FIG. 1, the HD controller 31 is capable of carrying out communication with the system controller 1 and the CD playback section 2 (CD controller 21) using various types of control signals CS. For example, the system controller 1 instructs dubbing to the HD controller 31 and carries out other instructions while dubbing playback data from the CD playback section 2 to the HDD 32. TOC information and text information read from the disc 90 to be played back is sent from the CD controller 21. This TOC information, etc. is used in the generation of disc identification information at a database (CDDB) described later. The HD controller 31 transmits information relating to the operating conditions (status) and the dubbing operation to the system controller 1 and the CD controller 21.

The HDD 32 reads and writes data under the control of the HD controller 31. Digital audio data S1 played back by the CD playback section 2 and digital audio data S2 provided by the audio input/output section 4 are subjected to prescribed processing and recorded in HDD 32. The recorded data are managed using the FAT 32 file system. Recorded data are read out by the HD controller 31, supplied to the audio input/output section 4 and outputted. For example, in the case in which a user carries out an operation to designate music etc. recorded in the HDD 32 for playback from the operation section 5, the controller 1 informs the HD controller 31 of the operation information. In doing so, the HD controller 31 plays back data of the designated song, etc. from the HDD 32 and supplies these data to the audio input/output section 4 as audio data S3. A database capable of recording. CD identification information and additional information is constructed at the HDD 32 in order to manage data recorded in the HDD32, as described later. The HD controller 31 refers to and updates the database stored in the HDD 32 as necessary.

An audio compression encoder/decoder circuit 33 and a buffer memory 34 are for carrying out processing on recorded data and playback data of the HDD 32. The digital audio data S1 from the CD playback section 2 and the digital audio data S2 from the audio input/output section 4 are inputted to the HD recording/playback section 3. In the case of being inputted, the digital audio data S1 and S2 are subjected to data compression processing by the audio compression encoder/decoder circuit 33. For example, MP3 format or ATRAC3 format compression processing also can be carried out. The compression-processed digital audio data are then stored in the buffer memory 34 and recorded in the HDD 32 under the control of the HD controller 31. In the case of playback from the HDD 32, data read from the HDD 32 are stored in the buffer memory 34 by the HD controller 31. The data are then read out from the buffer memory 34 at a prescribed rate and subjected to data expansion processing at the audio compression encoder/decoder circuit 33. As a result, the MP3 format or ATRAC3 form at compression processing is decompressed, and the data become normal digital audio data S3 and are outputted from the audio input/output section 4.

The compression method may be a method other than ATRAC3 such as, for example, MPEG audio, etc., or the data may be recorded in the HDD 32 without being compressed. The data recorded in the HDD 32 also may be encrypted, and then they may be decrypted at the time of playback.

Figure 4:
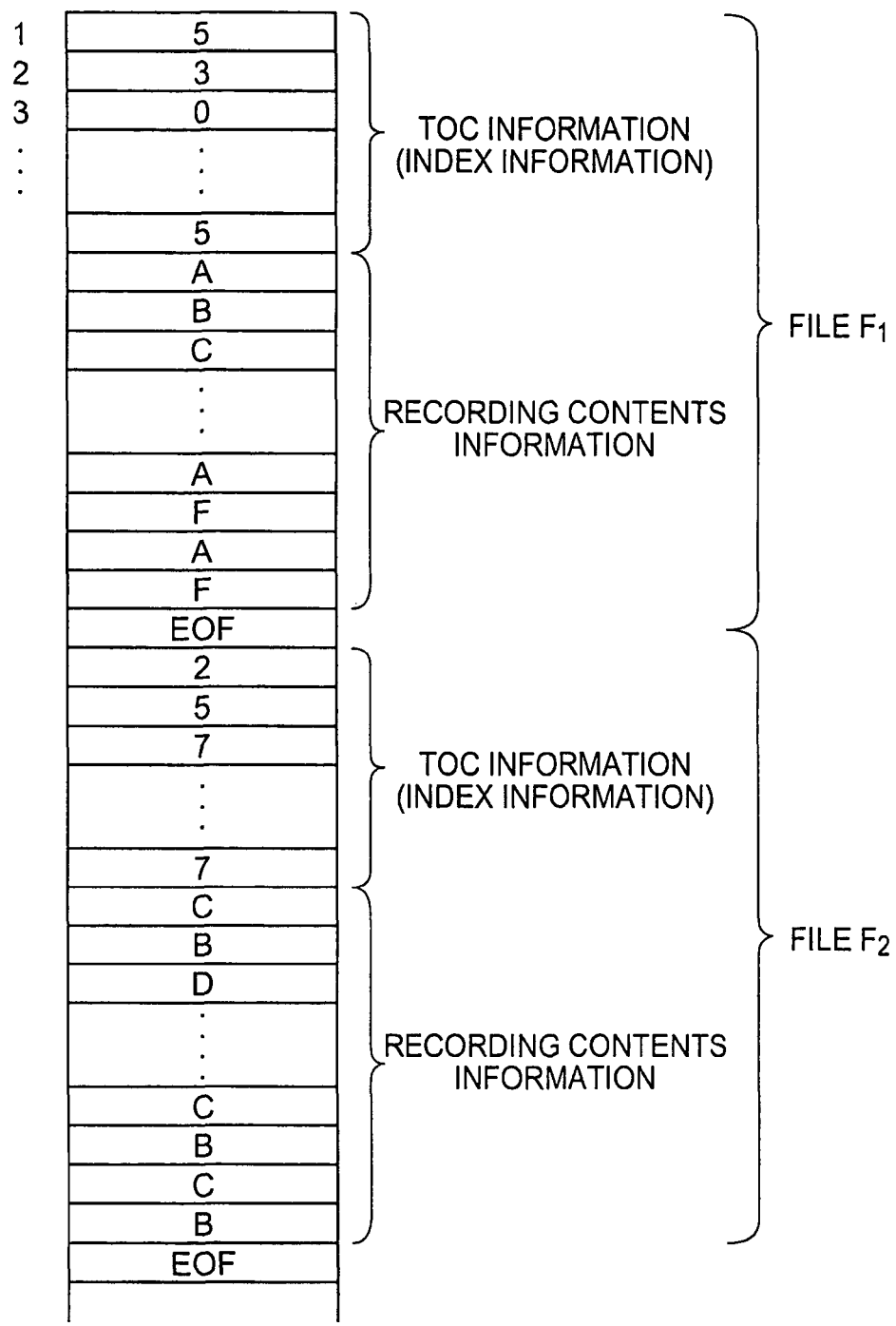
FIG. 4 is a schematic view of a file showing a data format of TOC information.

Next, a description is given with reference to FIG. 4 of TOC (Table of Contents) information constituting track information for the CD 90. With an optical disc such as, a compact disc, the format while recording data is constructed such that, in a direction from the inside of the disc towards the outside of the disc, a TOC region constituting a program management region, a program region, and a program end region referred to as a so-called lead out. In the CD, at least one or more music data programs are recorded in the program region at the middle region. Time information for every music data program and total time information for all programs are managed using the TOC information in the TOC region. Namely, with an optical disc such as, a CD, music information for every music data program in the program region and overall time information for all programs are managed using the TOC information in the TOC region. This TOC information is information that is unique to every optical disc. With an optical disc such as a CD, the TOC information therefore can be taken to be identification information unique to each disc.

TOC information for the CD loaded in the CD playback section 2 is read by the CD playback section 2 and stored in RAM 54 of the system controller 1 via the CD controller 21. Namely, TOC information for a plurality of CDs played back by the CD playback section 2 is stored sequentially in the RAM 54 as TOC information for a first CD, TOC information for a second CD, TOC information for a third CD, to TOC information for a nth CD (refer to FIG. 4). These items of information T1, T2, T3. Tn are separated by an identification code EOF referred to as "end of file". TOC information for a plurality of CDs read out by the CD playback section 2 is then separated using an identification code EOD referred to as "end of data". This information can be formed even if there is only one CD90.

Figure 5:
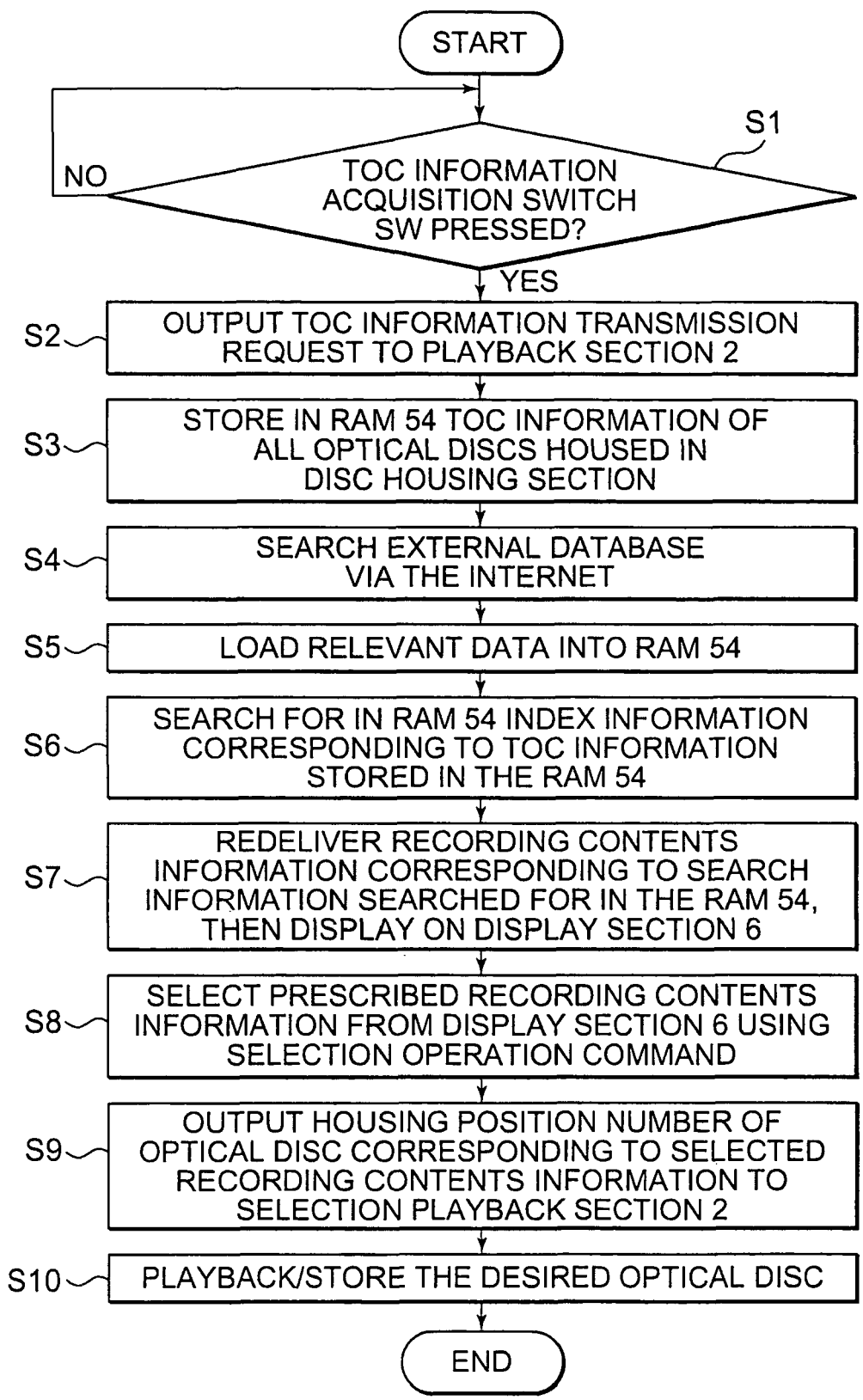
FIG. 5 is a flowchart showing an overall search operation.

Next, an information search operation performed by the playback/dubbing device 100 is described. As shown in step S1 of FIG. 5, a determination is made as to whether or not a TOC information acquisition operation has been carried out in order to acquire TOC information accompanying an input operation of the operation section 5 by a user. In the case that the TOC information acquisition operation is carried out, as shown in step S2, the system controller 1 sends a request for transmission of the TOC information to the CD playback section 2.

In the case in which a TOC information transmission request is received by the CD playback section 2, as shown in step S3, an unique identification information reader of the CD playback section 2 reads out TOC information for a CD. This read-out TOC information then is provided to the RAM 54 of the controller 1. The RAM 54 is then recorded with the TOC information. After this, as shown in step S4, the system controller 1 searches the external databases 46 to 49 via the network server 101 and the communication network 40. Related data searched, as shown in step S5, are then loaded into RAM 54 of the system controller 1.

Search information corresponding to TOC information stored in the RAM 54 then is searched for in the ROM 53 (step S6). As shown in step S7, recorded contents information corresponding to search information searched for in the ROM 53 is then relocated to RAM 54 and displayed at the display section 6.

The user then selects the desired recorded contents information using the display on the display section 6 using a select operation command. After that, the storage number of the CD corresponding to the recorded contents selected is output by the CPU 52 of the system controller 1 to the HD recording/playback section 3. The playing back/storing (archiving) of the desired CD 90 takes place in step S10.

Next, the details of the operation of step S4 and step S5 of searching an external database from the playback/dubbing device 100 are described with reference to FIG. 6. As shown in step S13, a CD is inserted into the HD recording/playback section 3 of the CD playback device 2 and the TOC information shown in FIG. 4 is read out at the HD recording/playback section 3. When this TOC information is loaded into RAM within the system controller 1, the system controller 1 accesses the TOC album relevant information database (CDDB) 46 via the network server 101 and communication network 40 (step S15). The CPU 52 of the system controller 1 then determines whether or not album data corresponding to the TOC information are present (step S16). In the case in which a corresponding album data exists, the album name and song title information is acquired and provided to the system controller 1, and the operation completes.

In the case in which corresponding album data are not searched, information that there are no data is returned to the system controller 1 in step S17. In doing so, the CPU 52 of the system controller 1 instructs the CD playback section 2 to read out ISRC information, which is copyright information, using the CD controller 21 (step S18). The data acquired in this manner are data for ISRC code relating to copyright information. The data for the ISRC information acquired here are not used as is but are converted to the data shown in step S19. These converted data are sent to the search engine 49 via the communication network 40 in step S20. After this, as shown in step S21, homepage data for the company producing the CD or homepage data for a sales company are acquired using the database 47 of homepage information for a music company or using a database 48 of the record shop, and the CD is searched from these data as shown in the next step S22. The searched CD data are then sent to the system controller 1 via the communication network 40 and the network server 101, loaded into RAM 54, and outputted and displayed by the display section 6 (step S23). In the case of automatic selection, the album name and song title information is acquired by automatic selection of corresponding data (step S24), while in the case of manual selection, the album name and song title information is acquired as a result of selection by the user (step S25).

Figure 7:
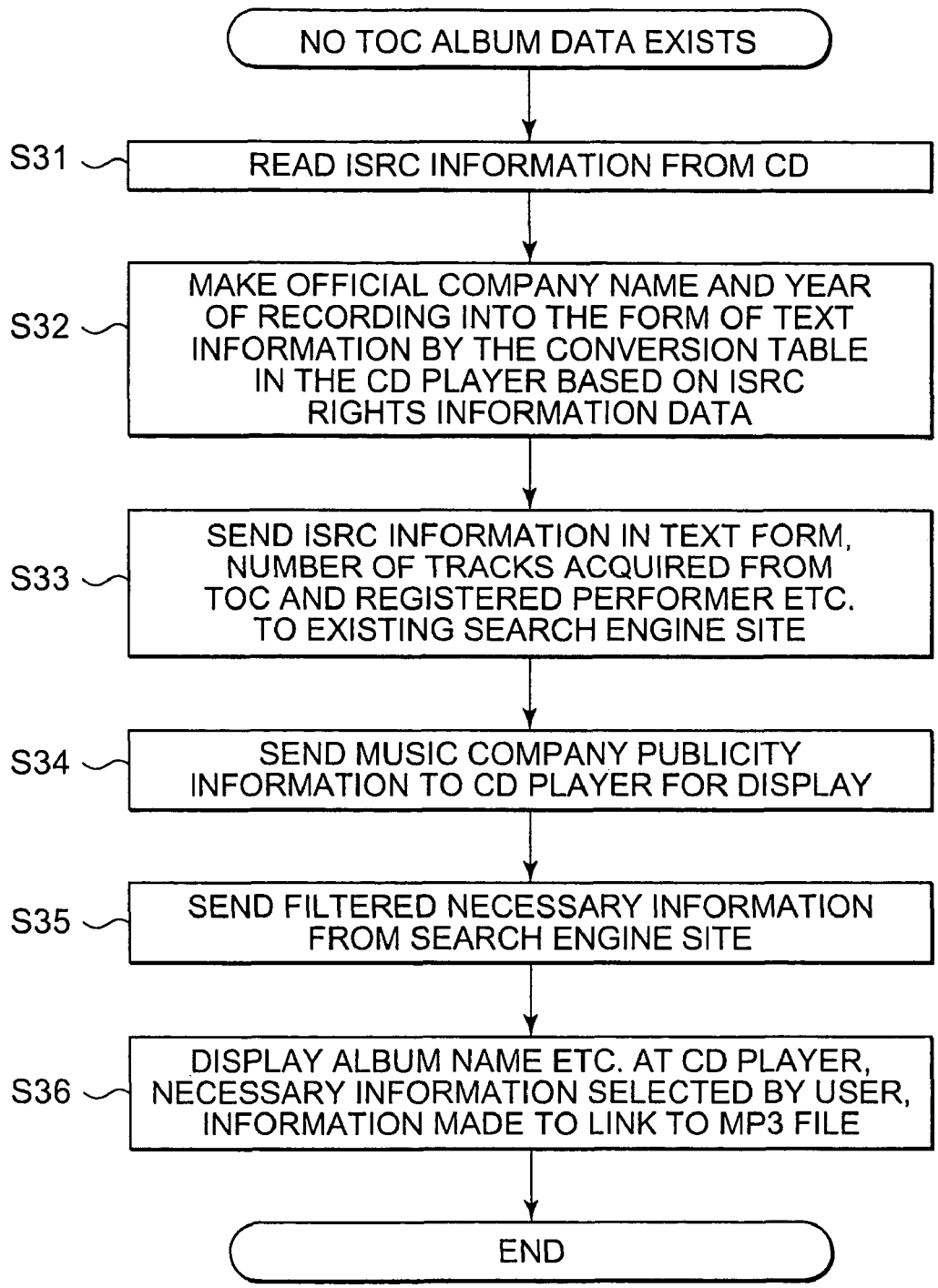
FIG. 7 is a flowchart showing an operation for acquiring contents information of a modified example.

FIG. 7 shows a modified example of a search operation. This operation is an operation in the case where there is no album name data corresponding to the TOC information. ISRC information, which is the copyright information, is read out from the CD 90 in step 31. Next, as shown in step S32, the official company name and recording name are put into the form of text information using a conversion table within the CD playback section 2 based on ISRC copyright information. Information relating to the number of tracks, the performer etc. acquired from the ISRC information put in the text form in step S33 and the TOC information are sent to the search engine 49 connected over the communication network 40 via the system controller 1 and the network server 101. As a result, the search engine 49 sends music company information from the home page of the music company or advertising information from the home page of the sales company to the system controller 1 on the side of the playback/dubbing device 100 via the communication network 40 and the network server 101 and the contents are displayed by the display section 6 (step S34).

Next, as shown in step S35, filed necessary information is sent from the search engine 49. As shown in step S36, after this, the album name, etc. are displayed at the display section 6 of the playback/dubbing device 100, the required information is selected by the user using a mouse and a pointer, and this information is linked to MP3 filing and stored together with contents related with music information for the CD on the HD recording/playback section 3.

Figure 6:
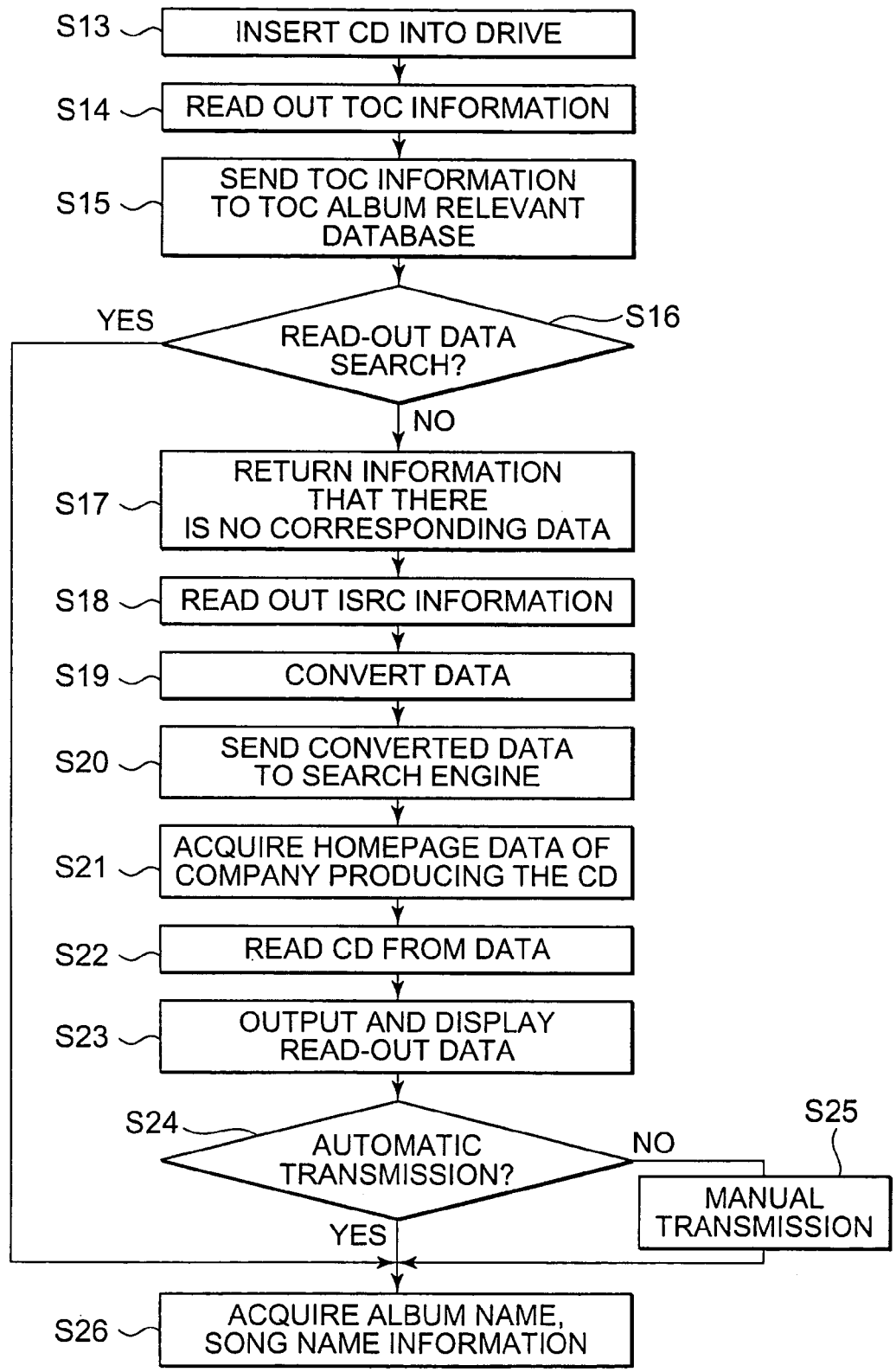
FIG. 6 is a flowchart showing an operation for acquiring contents information utilizing an external database.
Figure 8:
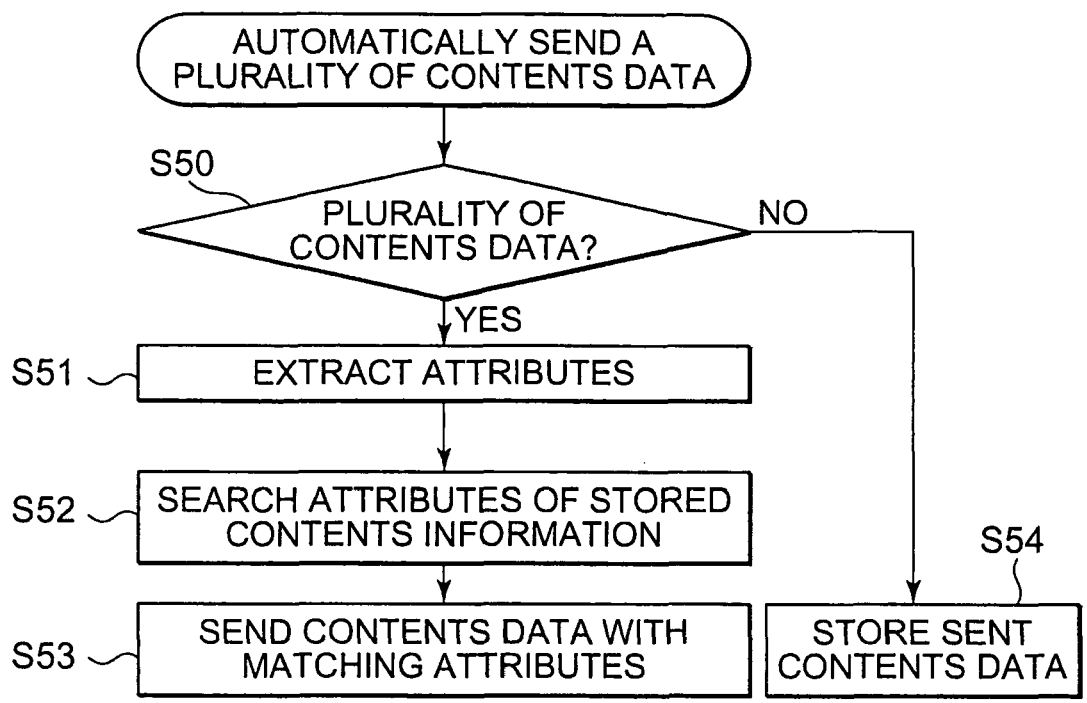
FIG. 8 is a flowchart showing an operation for automatically selecting specific contents information from a plurality of items of contents information.

FIG. 8 shows the operation of step 24 in the flowchart of FIG. 6 in more detail. In step S50, a determination is made as to whether or not the contents data are a plurality of data. If so, attributes are then extracted from the contents data. Attributes for stored contents information are then searched, and contents data for which the attributes match are selected. In the case in which there is just one item of contents data, the transmitted contents data are recorded as is as music information (contents information) by the HD recording/playback section 3 so as to relate to the contents of the CD.

Figure 9:
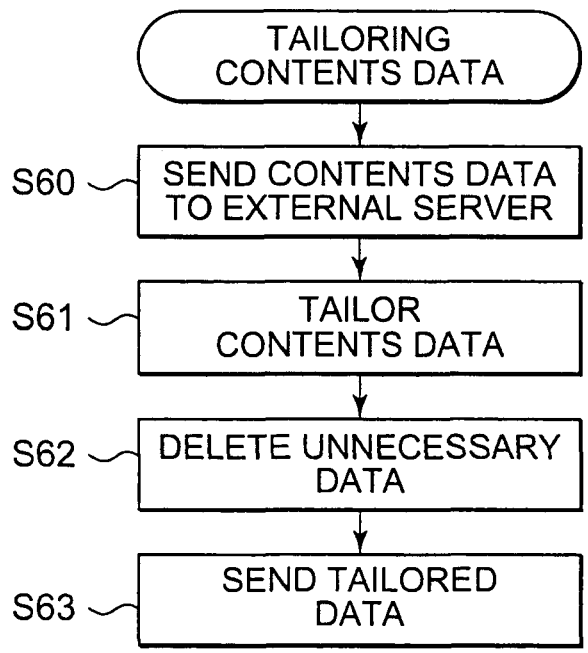
FIG. 9 is a flowchart showing an operation for tailoring contents data.

FIG. 9 shows an operation relating to tailoring of contents data in a certain database from the search engine page 49 shown in FIG. 1. In the case in which contents data are sent to the search engine page 49, the search engine page 49 tailors the contents and deletes unnecessary data. The tailored contents are then loaded in RAM 54 of the system controller 1 of this apparatus via the communication network 40 and the network server 101. It is therefore possible for the tailored data to be acquired as an album name or song title information so that data stored at the HD recording/playback section 3 do not contain any unnecessary data.

In the case in which there are no corresponding data in the TOC album relevant information (CDDB) 46 constituting a CD database, in the case in which two or more items of album information are present in the CDDB 46, or in the case in which album information is incorrect, in the present embodiment it is possible to make effective use of ISRC code information constituting copyright information recorded in the CD 90 and homepage databases 47, 48, etc. of a music company or sales company so as to enable various problems encountered with album name and song title acquisition services that were based on TOC information of the related art to be overcome. It is therefore possible for this to be beneficial to both the user and the CD maker or sales company by automatically providing information that brings about sales for the music company selling the product at the time of album title or song title acquisition.

In album name and song title services based on the TOC information, external databases 46 to 49 are accessed via the network server 101 using TOC information at the time of playback by the CD playback section 2 of the playback/dubbing device 100. In the external database 46, TOC information and album information are stored together, and album names and song titles corresponding to the TOC information are returned to the playback/dubbing device 100. This playback/dubbing device 100 may have an Ethernet terminal and connect to a network server 101, which is an internet service provider.

When the CD 90 is inserted into the CD playback section 2, as shown in FIG. 6, TOC information of the CD 90 is sent through the Ethernet terminal from the network server 100 to the TOC album relevant database 46 via the communication network 40. The same data as the transmitted TOC information are then searched for within the database 46. In the case in which the search results do not turn up corresponding data, an indication that there are no data is returned to the playback/dubbing device 100 via the network server 101. The CD playback section 2 then reads out the ISRC of the CD90, because it is not possible to acquire album information using the playback/dubbing device 100. As the ISRC copyright information and recording year information are merely bit data, at the conversion table within the CD playback section 2, the number of tracks of the TOC information is sent to an existing search engine 49, and data are acquired from the home page databases 47 or 48 of the music company or sales company selling the CD 90.

As the method of utilizing the ISRC data, it is possible to utilize any of methods such as a method of specifying the company producing the CD or the sales company using copyright information within the ISRC, a method of specifying the year the CD was recorded using recording year information within the ISRC, a method of specifying the recording order of the CD using recording number information within the ISRC, or a method of specifying the number of tracks of the CD using TOC information.

Therefor, by utilization of ISCR information as above, a few tens of albums can be specified depending on the music company. In the case in which the number of tracks is very unique, for example, English conversation teaching materials, etc., where the number of tracks is extremely large compared to usual music albums, this album can be surely specified. The obtained information is then displayed using the display section 6 of the playback/dubbing device 100, and the operating user then designates the same album name as the current CD 90. After designating the album name and song title information, they are linked to an archived file of the HD recording/playback section 3, which is compressed by a method such as MP3.

In the case of the flowchart shown in FIG. 7, there is a flow of sending advertisements of the music company or sales company in step 34. It is possible to send information of an album newly issued at this step. This example shows an example where searching is not possible using album name and song title acquisition services based on external TOC information, but even the searching succeeds, if advertisements of a music company or sales company can be provided like this example, this is of benefit to the music company or the sales company. Further, whether or not the acquired album name, etc. is correct can easily be confirmed using data of the homepage of the music company. In this embodiment, information filing is carried out by using the search engine 49, but it is also possible to have a dedicated site made and administered by a service administration company. It is also possible to convert the ISCR copyright information into a normal company name using the playback/dubbing device 100, but in the case in which a dedicated site is utilized, it is also possible to send raw data as is and have this data converted within the site itself. In this case, it is easier to specify a recorded album estimated using items such as the same number of tracks and the recording number based on the number of tracks obtained from the TOC data within the dedicated conversion site, and it is then possible to return information of album and song title, which have been tailored, to a playback/dubbing device or CD player.

The ISRC is constructed from 60 bits for each song. A country code, a copyright code, the year recorded, and a recording number are described in the ISRC. The country code is coded in the form of two alphabetic characters. The alphabetic characters are encoded using six bits. The copyright code is coded in the form of three alphabetic characters. The alphabetic characters are similarly encoded using six bits. The recording is described using four bits in BCD (binary coded decimal) and is two columns of numbers.

Album data is quite specified by the ISRC constituting copyright information, but since large music companies release a large number of CDs, a large number of hits occur upon accessing to search the database. In order to avoid this, the automatic selection of FIG. 8 is utilized. Names of performers to which a user principally listens are registered in advance, or performer information of files that are automatically archived is sent to the homepage database 47 of the music company. Generally, if a person likes a certain type of performer, the likelihood of the person buying an album by that performer is increased, so that it is possible to make searching easier by first displaying albums by that performer.

The description is given of the present invention in the above using the embodiments as shown in the drawings, but the invention of this application is by no means limited to the above embodiments, and various modifications are possible while still remaining within the scope of the technological concept of the invention of the preset invention. For example, in the above embodiment, searching is carried out based on TOC information and ISRC information recorded in a CD, but it is also possible to carry out searching based on POS data recorded in a CD. In the description of the embodiment above, an example is given of a digital audio CD where music information is written using a digital signal, but providing a similar code is entered, this system may also be utilized using DVDs, MDs or next generation media. In addition to music, application is also possible in visual equipment. Further, an example is given where a network function is provided inside a CD player, but a personal computer having a recording/playback function may also be used, and displaying also may take place at an externally attached screen or at an external display.

The present invention may be broadly utilized for displaying or storing album names and song titles of CDs in a playback or dubbing apparatus for digital audio such as a CD.

What is claimed is:

1. A media information search apparatus, comprising:
a recording or reproducing device for playing back and storing in a first memory signals and table information recorded in a recording medium, wherein said signals recorded in the recording medium comprise of a music content;
means for querying databases connected to said recording or reproducing device via a communication network, for retrieving contents information corresponding to the music content recorded in the recording medium, by querying a first database for contents information corresponding to the music content, and querying a second database for contents information corresponding to the music content if the first database query fails to return contents information corresponding to the music content,
wherein the first database provides the contents information corresponding to the music content in association with a content identifier and when the first database provides the contents information the contents information is loaded into a second memory of the recording or reproducing device,
wherein the second database is a web-database that stores website files and provides the contents information corresponding to the music content in association with a copyright identifier when the means for querying the database queries the second database by browsing the website files for the copyright identifier and when the second database provides the contents information the contents information is loaded into the second memory of the recording or reproducing device, and wherein the copyright identifier is different from the content identifier;

means for extracting the table information from the first memory based on the contents information stored in the second memory and storing it in the second memory, and means for displaying the table information stored in the second memory; and means for determining whether the contents information contains a plurality of information, wherein, when the plurality information is not found, the contents information is stored on the first database in correspondence to the music content, and wherein, when the plurality information is found:
  attributes are extracted from the plurality information and are matched to the music content, and
  contents information corresponding to the attributes is selected and stored on the first database in correspondence to the music content.

2. The media information search apparatus, according to claim 1, wherein
  said web-database corresponds to a music company or music mail order company, and said copyright identifier is a recording year information identifier.

3. The media information search apparatus, according to claim 1, wherein
  said content identifier is a track information identifier.

4. The media information search apparatus, according to claim 1, wherein
  said contents information is stored in storage means of a server connected via a communication network.

5. The media information search apparatus, according to claim 1, wherein
  said contents information is stored in storage means of said media information search apparatus.

6. The media information search apparatus, according to claim 1, wherein prior to storing the contents information corresponding to the re music content on the first database, the contents information is tailored and unnecessary data is deleted to generate an album name and a song title for the music content.

7. A media information search method of searching contents information corresponding to audio signals when said audio signals recorded in a recording medium are played back or stored in a first memory, comprising:
  accessing a track information database via a communication network based on track information of said audio signals to acquire said corresponding contents information and when the corresponding contents information is acquired from the track information database the acquired corresponding contents information is loaded into a second memory; and
  converting the acquired corresponding contents information into text information; and
  accessing a web-database that stores website files of a music company or music mail order company via a communication network based on copyright information of said audio signals by browsing the website files for the copyright information to obtain said corresponding contents information if said corresponding contents information is not found within said track information database and when the corresponding contents information is obtained from the track information database the obtained corresponding contents information is loaded into a second memory;
  converting the obtained corresponding contents information into text information; and
  searching the text information for a plurality information:
  presenting an extracted information for selection,
  wherein searching the text information for the plurality information, includes:
    storing, when the plurality information is not found, the obtained corresponding contents information as a first content information corresponding to the audio signals on the track information database, and
  wherein searching the text information for the plurality information, further includes:
    generating, when the plurality information is not found, the extracted information by extracting attributes from the text information,
    selecting, after the presenting the extracted information for selection, the extracted information that matches the audio signal, and
    storing the attributes that corresponds to the extracted information that matches the audio signals as the first content information corresponding to the audio signal on the track information database.

8. The media information search method according to claim 7, wherein
  if two or more said corresponding contents information exist within said track information database or said web-database of a music company or music mail order company, similar contents information is automatically searched using pre-stored contents information.

9. The media information search method according to claim 7, wherein
  if two or more said corresponding contents information exist in said track information database or said web-database of a music company or music mail order company, contents of two or more said corresponding contents are displayed so as to be selected said contents information by a user.

10. The media information search method according to claim 7, wherein
  an advertisement of said music company or music mail order company is automatically sent to a search side if said web-database of said music company or music mail order company is accessed.

11. The media information search method according to claim 7, wherein
  an external conversion site connected via said communication network tailors said contents information and deletes unnecessary data to generate an album name and a song title for the recording medium signal.

12. A media information recording playback apparatus, comprising:
  recording playback means for playing back and storing in a first memory audio signals and table information of a recording medium that recorded said audio signals and copyright information, wherein said audio signals of a recording medium comprise of a music content;
  means for querying databases connected to said recording or reproducing device via a communication network, for retrieving contents information corresponding to the music content recorded in the recording medium, by querying a first database for contents information corresponding to the music content, and querying a second database for contents information corresponding to the music content if the first database query fails to return contents information corresponding to the music content, wherein the first database provides the contents information corresponding to the music content in association with a content identifier and when the first database provides the contents information the contents information is loaded into a second memory of the recording or reproducing device, wherein the second database that is a web-database that stores website files provides the contents information corresponding to the music content in association with a copyright identifier when the means for querying the database queries the second database by browsing the website files for the copyright identifier and when the second database provides the contents information the contents information is loaded into the second memory of the recording or reproducing device, and wherein the copyright identifier is different from the content identifier; and means for extracting the table information from the first memory based on the contents information stored in the second memory and storing it in the second memory, and means for displaying the table information stored in the second memory, means for determining whether the contents information contains a plurality of information, wherein, when the plurality information is not found, the contents information is stored on the first database in correspondence to the recording medium signal, and wherein, when the plurality information is found:
attributes are extracted from the plurality information and are matched to the recording medium signal, and
contents information corresponding to the attributes is selected and stored on the first database in correspondence to the recording medium signal.

13. The media information recording playback apparatus, according to claim 12, wherein
said web-database corresponds to a music company or music mail order company, and said copyright identifier is a recording year information identifier.

14. The media information recording playback apparatus, according to claim 12, wherein
said content identifier is a track information identifier.

15. The media information recording playback apparatus, according to claim 12, wherein
said contents information is stored in storage means of a server connected via said communication network.

16. The media information recording playback apparatus, according to claim 12, wherein
said contents information is stored in storage means of said media information search apparatus.

17. The media information recording playback apparatus, according to claim 12, wherein prior to storing the contents information corresponding to the recording medium signal on the first database, the contents information is tailored and unnecessary data is deleted to generate an album name and a song title for the recording medium signal.

18. An apparatus, comprising:
a playback and recording section configured to play, record, and store in a first memory a recording medium signal and a table information;
a communication section configured to establish a connection with a first database, a second database, and a third;
a system controller section configure
to access the first database through the communication section when the playback and recording section initiates a playing, a recording, or a storing in the first memory of the recording medium signal, to retrieve through the communication section content information corresponding to the recording medium signal from the first database and when the first database provides the contents information the contents information is loaded into a second memory,
to access the second database through the communication section for contents information corresponding to the recording medium signal if the first database fails to return contents information corresponding to the recording medium signal and when the second database provides the contents information the contents information is loaded into the second memory, and
to store an address information corresponding to the acquired content information loaded into the second memory on the third database when content information is successfully acquired, wherein the second database is a web-database that stores website files, and wherein accessing the second database is an automatic browsing of the website files for copyright information; and means for extracting the table information from the first memory based on the contents information stored in the second memory and storing the table information extracted from the first memory in the second memory, and means for displaying the table information stored in the second memory, means for determining whether the contents information contains a plurality of information, wherein, when the plurality information is not found, the contents information is stored on the first database in correspondence to the recording medium signal, and wherein, when the plurality information is found:
attributes are extracted from the plurality information and are matched to the recording medium signal, and
contents information corresponding to the attributes is selected and stored on the first database in correspondence to the recording medium signal.

19. A search method, comprising:
accessing a first database through a communication network when a playing of an audio signal of a recording medium initiates;
acquiring a first content information corresponding to the audio signal stored on the first database;
accessing a second database when the first database does not contain the first content information corresponding to the audio signal;
acquiring a second content information corresponding to the audio signal stored on the second database when the second database is accessed;
storing an address information corresponding to an acquired information on a third database when first or second content information is successfully acquired,
wherein the acquired information corresponds to the first content information or second content information,
wherein the second database is a web-database that stores website files, and
wherein accessing the second database is an automatic browsing of the website files for copyright information;
converting the acquired information to a text information; and
searching the text information for a plurality information;
presenting an extracted information for selection, wherein searching the text information for the plurality information, includes:
  storing, when the plurality information is not found, the acquired information as the first content information corresponding to the audio signal on the first database, and
wherein searching the text information for the plurality information, further includes:
  generating, when the plurality information is not found, the extracted information by extracting attributes from the text information,
  selecting, after the presenting the extracted information for selection, the extracted information that matches the audio signal, and
  storing the attributes that corresponds to the extracted information that matches the audio signal as the first content information corresponding to the audio signal on the first database.

20. The apparatus of claim 18, wherein prior to storing the contents information corresponding to the recording medium signal on the first database, the contents information is tailored and unnecessary data is deleted to generate an album name and a song title for the recording medium signal.

21. The search method of claim 19, wherein the extracted information presented for selection is presented to an automatic selection means.

22. The search method of claim 19, wherein the extracted information presented for selection is presented to an manual selection means.

23. The search method of claim 19, wherein prior to storing the first content information corresponding to the audio signal on the first database, the first content information is tailored and unnecessary data is deleted to generate an album name and a song title for the audio signal.

* * * * *